Sept. 24, 1963   P. KOVANIC ETAL   3,105,029
EQUIPMENT FOR AUTOMATIC CONTROL OF ATOMIC REACTOR
Filed Feb. 16, 1959
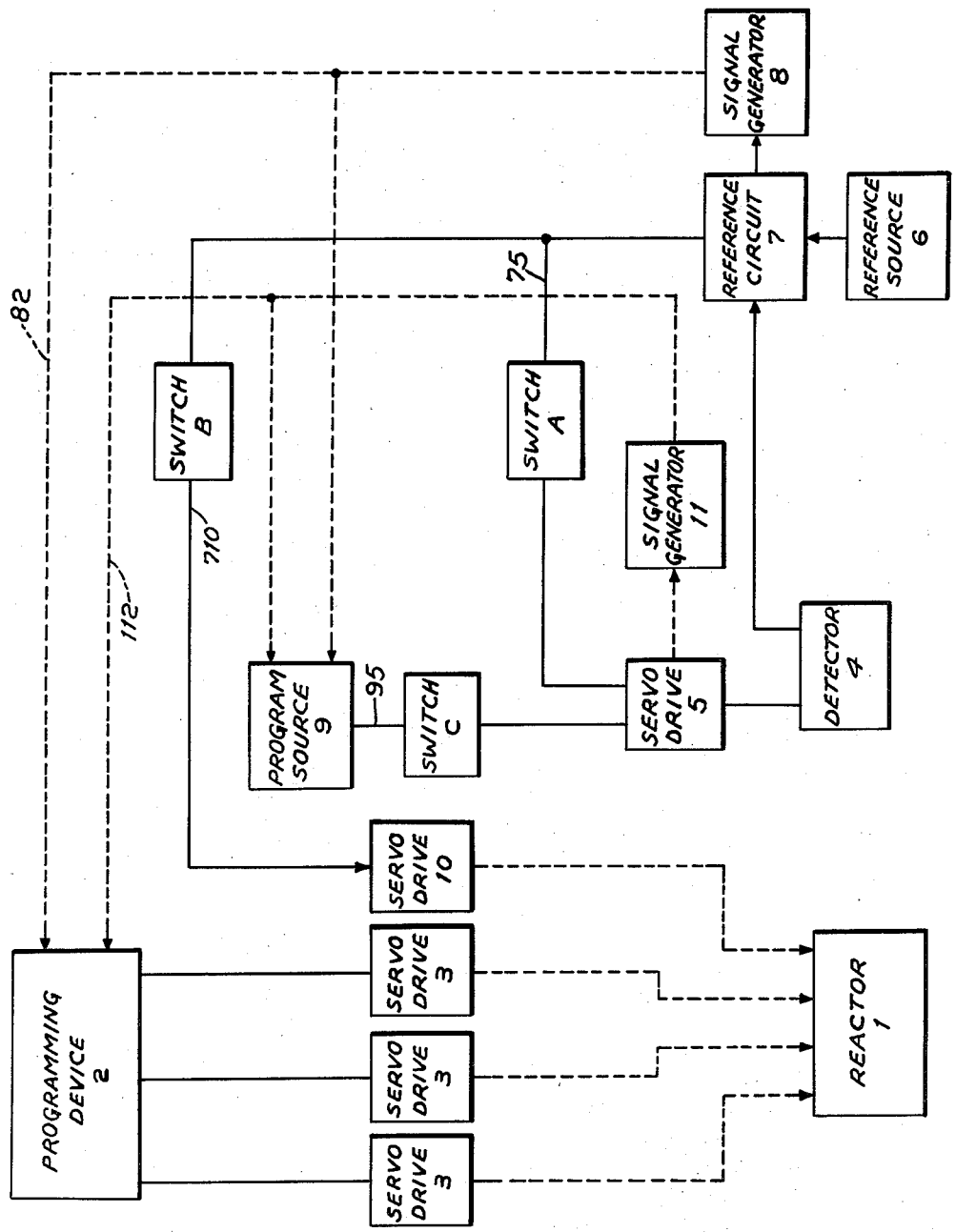
INVENTORS.
Pavel Kovanic
BY Milan Kulka

3,105,029
EQUIPMENT FOR AUTOMATIC CONTROL OF ATOMIC REACTOR

Pavel Kovanic and Milan Kulka, Prague, Czechoslovakia, assignors to Zavody V. I. Lenina Plzen, narodni podnik, Plzen, Czechoslovakia
Filed Feb. 16, 1959, Ser. No. 793,638
Claims priority, application Czechoslovakia Feb. 18, 1958
5 Claims. (Cl. 204—193.2)

At present time there are not known any simple and sufficiently reliable devices for the automatic control of reactors, which would permit entrusting the control of the reactor to an automatic system not only in maintaining the output at a constant level, but also in starting the reactor from the subcritical state and in effecting changes of the output by many orders of magnitude. Reactors are controlled either exclusively manually or the individual stages of the process of control are automated. Schemes for maintaining the output at a constant level are known. There exist methods for starting the reactor from the subcritical state until the output at which the control device is sensitive is attained. Devices are also known for effecting controlled changes of the reactor output within a comparatively small range. Each of the known devices, however, works on only one portion of the range of power levels, and devices known from the pertinent literature, for controlling the reactor during various portions of the range of power levels, consist of different elements, so that one device cannot replace or eliminate another. The use of known devices would require much switching-over during variations of output, which would essentially complicate the automatic equipment and would render the function of the equipment rather unreliable. Regulating systems employing a movable detecting element have better possibilities, but by themselves cannot completely solve the task of complete automation of the control of atomic reactors.

The problem of automatic reactor control of the reactor throughout the full range of power levels has been solved by the invention. In accordance with an aspect of the invention, automatic apparatus for the control of the atomic reactor comprises a movable detecting element measuring the intensity of radiation. The signal from the detecting element is compared in a reference circuit with a signal from a reference source. The magnitude of the signal from the reference source determines the operating level of the detecting element as will become presently apparent. A servo-drive is provided for moving the detecting element. A signal generator receives an output or error signal of the reference circuit to generate a control signal as will be explained in more detail hereinafter. Another signal generator is coupled to the servo-drive of the detecting element to generate a position signal responsive to the position of the detecting element. Movement of the detecting element by its servo-drive may be controlled by a program source which thereby also controls the reactor in a manner that will be more explicitly set forth as the disclosure proceeds.

The reactor is equipped with compensating devices, hereinafter referred to as control rods, the positions of which determine the multiplication factor of the reactor as is well known. The movements of the control rods are actuated by servo-drives which are sequentially brought into action by a programming device according to the desired program of reactor output. At least one control rod acting as a regulator rod is equipped with a servo-drive independent of the programming device. Amplifiers and an integrator may be employed to transmit the error signal of the reference circuit to one of the servo drives. Suitable switching devices connect the several elements enumerated above in such a manner that the apparatus may sequentially and alternatively measure and control the multiplication factor and output of the reactor during the subcritical stage, usually referred to as the "source range," may measure and control the period of the reactor by means of the movable detecting element in the "period ranrge," and automatically maintain constant output over the power operation range with the detecting element stationary. The change from one type of operation to another is accomplished by means of feedback connections between the actuators of the switching devices and the afore-mentioned signal generators and program sources of the automatic apparatus of the invention, or by connections with external controls.

The exact nature of this invention as well as other features and advantages thereof will be readily appreciated as the same becomes better understood by reference to the following detailed description of a preferred embodiment when considered in connection with the accompanying drawing the sole FIGURE of which is a diagram of an automatic control device according to the invention.

The reactor 1 includes several compensating control rods and a regulating control rod the movements of which are respectively controlled by servo-drives 3 and 10. The individual servo-drives 3 of the several compensating control rods are controlled by a programming device 2 which is adapted to put the servo-drives into sequential action for varying the multiplication factor of the reactor during the source period.

A detector 4 senses the radiation output of the reactor 1. It is movable within the radiation field of the reactor 1 by a servo-drive 5. The output signal of the detector 4 is fed to a reference circuit 7 which may include an integrator for integrating the detector signal if it is a pulsed signal, and an amplifier for amplifying the output signal. The detector signal, modified by the integrator and amplifier as required, is compared with the signal of a reference source 6, hereinafter referred to as a reference signal. The magnitude of the reference signal determines the operating level of the detector 4 in the following manner:

A circuit 75 which includes a switch A connects the reference circuit 7 to the servo-drive 5 of the detector 4. The error signal received from the reference circuit 7 causes the servo-drive 5 to move the detector 4 in such a direction that the magnitude of the error signal is reduced. The arrangement described thus will automatically tend to maintain the error signal at a minimum value, and to keep the detector 4 in a position in which its output is related to the reference signal in such a manner as to minimize the error signal. In view of the fixed relationship between the radiation received by the detector 4 and the output signal produced, the magnitude of the reference signal determines both a desired signal output from the detector and a desired location of the detector relative to the radiation intensity of the reactor 1, the desired signal output and location being jointly and individually referred to as the operating level of the detector. The apparatus described will automatically tend to restore the operating level of the detector 4 when a deviation occurs.

A signal generator 8 is connected to the reference circuit 7 to generate a control signal responsive either to a predetermined magnitude of the error signal of the circuit 7, or responsive to a predetermined rate of change of the error signal, that is, to the first derivative of the error signal magnitude with respect to time. Another signal generator 11 is connected to the servo-drive 5 of the detector 4 to generate a position signal when the detector 4 reaches a predetermined position.

A program source 9 is connected to the detector servo-drive 5 by a circuit 95 which includes a switch C. When the switch C is closed and the aforementioned switch A is open, the program source 9 controls the movement of the detector 4 by the servo-drive 5. A circuit 710 which includes a switch B connects the output side of the reference circuit 7 to the servo-drive 10 of the regulating control rod.

The apparatus described so far starts the reactor and controls its output in the source range when the switches B and C are open and the switch A is closed. The compensating control rods are moved by the servo-drives 3 to increase the multiplication factor of the reactor toward the critical level according to the program of the programming device 2. As the reactor output increases, the detector 4 is moved away from the reactor by the servo-drive 5 to maintain the operating level of the detector 4 determined by the reference signal. The movement of the detector 4 thus follows the power level of the reactor in the first phase of reactor operation, that is, through the source range.

If the multiplication factor should vary in an undesirable manner, the resulting increase in the magnitude of the error signal from the reference circuit 7 or in the rate of change of the error signal will cause a control signal to be generated by the signal generator 8. Similarly, an abnormally high reactor power level of the reactor 1 and the corresponding position of the detector 4 will cause a position signal to be generated by the signal generator 11. The control signal, the position signal or both may be fed to the programming device 2 by circuits 82 and 112, which respectively connect the signal generators with the programming device 2, to modify the action of the latter.

When during its normal start-up the reactor reaches a predetermined condition, the control apparatus is switched automatically to function as a period regulator. The switches A, B, and C are actuated in a manner not further illustrated by either a position signal or a control signal from one of the signal generators 8, 11 in such a manner as to open the circuit 75 and to close the circuits 710 and 95, respectively controlled by the switches A, B, C. The signal for the change from one type of operation to the other may also originate from a source which is not an element of the automatic equipment shown in the drawing, such as an independent measuring system.

In the second stage of reactor operation, that is, in the period range, the detector 4 is moved by the servo-drive 5 according to the predetermined program of the program source 9, and the power level of the reactor 1 is controlled by the regulating control rod actuated by the servo-drive 10 in such a manner that the changes of power level resulting from the movement of the regulating rod hold the error signal from the reference circuit 7 at a minimum value. Whereas in the first stage of reactor operation, the movement of the detector 4 followed the changes of power level brought about by the compensating control rods according to the program provided by the programming device 2, in the second stage the changes in power level follow the movement of the detector 4 according to the program of the program source 9. The period of the reactor is thus determined by the velocity of the movement of the detector 4.

When the power level of the reactor 1 reaches a predetermined magnitude while the detector 4 assumes a corresponding position, the signal generator 11 issues a position signal. An equivalent signal may obviously be derived from a device which measures reactor power level independently of the automatic control elements illustrated. The signal switches the apparatus to a condition in which it maintains constant reactor power level by actuating the switch C in a manner well known and not further illustrated, and interrupting the circuit 95. It will be remembered that the switch A had previously been open, and the switch B closed.

The error signal from the reference circuit 7 causes the regulating control rod of the reactor 1 to be shifted by the servo-drive 10 in such a manner that the output of the detecting element, which now is stationary, is restored to the value determined by the magnitude of the reference signal from the source 6. If it is desired to change the power level of the reactor 1 during this third stage of reactor operation, it is merely necessary to shift the position of the detecting element. The regulating control rod will change the output level of the reactor correspondingly with a period determined by the velocity of detector movement. When the detector again stands still in the shifted position, the new output level of the reactor is again automatically maintained.

Proper functioning of the equipment described can be readily verified. Inspection of the detector 4 will reveal any unusual position thereof. Another check can be performed by determining whether the program source 9 and the servo-drive 5, when the switch C is closed, will shift the detector 4 from a position occupied when the circuit 75 was closed by the switch A and the circuit 710 was open at the switch B. After the detector 4 has been shifted into a new position, the circuit 75 is again closed by the switch A, and the circuit 710 is opened at the switch C. If the system is in proper working order, the detector 4 automatically returns to its initial position.

A further verification of the condition of the control apparatus can be obtained by causing the program source 9 to act on the position of the detector 4 in such a manner that the signal generators 8, 11 are successively actuated, thus permitting them to be tested. A combination of these tests can be employed for ascertaining that the equipment is operating correctly without the use of devices not part of the equipment itself.

The advantages of the control device of the invention are simplicity, compactness, multiple utilization of all components so as to reduce the number of necessary components, reliability, the testing of accurate operation by means of the operating components included in the device, and easy verification of its readiness for operation.

What we claim is:

1. In a control device for an atomic reactor emitting a field of radiation and having a plurality of control rod means for controlling the intensity of said field, in combination, a plurality of first drive means for respectively actuating movement of corresponding ones of said control rod means; first programming means for controlling actuation of one of said control rod means by the corresponding first drive means according to a predetermined program; detecting means in said field for emitting an output signal responsive to the intensity of radiation of said reactor to which said detecting means is subjected; a source of a reference signal; reference circuit means for comparing said signals, and for generating an error signal responsive to the compared signals; second drive means for actuating movement of said detecting means relative to said field; first circuit means interposed between said reference circuit means and said second drive means and including first switch means selectively operable to connect said reference circuit means to said second drive means for movement of said detecting means relative to said field responsive to said error signal in a direction for reducing the magnitude of said error signal; second circuit means interposed between said reference circuit means and another one of said first drive means and including second switch means selectively operable to connect said reference circuit means to said other first drive means for movement of a corresponding other control rod means responsive to said error signal in a direction for reducing the magnitude of said error signal; second programming means; and third circuit means interposed between said second programming means and said second drive means and including third switch means selectively operable to connect said second programming means to said second drive means for movement of said detecting means relative to said field according to a program of said second programming means.

2. In a control device as set forth in claim 1, first signal generating means responsive to said error signal for generating a control signal when said error signal has a predetermined property selected from the group consisting of error signal magnitude and rate of change of error signal magnitude; and fourth circuit means for transmitting said control signal to one of said programming means for controlling operation of the latter.

3. In a control device as set forth in claim 1, second signal generating means responsive to the position of said detecting means to generate a position signal when said detecting means is in a predetermined position relative to said reactor; and fifth circuit means for transmitting said position signal to one of said programming means for controlling operation of the latter.

4. In a control device for an atomic reactor emitting a field of radiation and having at least one compensating control rod and one regulating control rod for controlling the intensity of said field, in combination, first drive means for actuating movement of said compensating rod; first programming means for controlling actuation of said compensating rod by said first drive means according to a predetermined program; detecting means in said field for emitting an output signal responsive to the intensity of radiation of said reactor to which said detecting means is subjected; a source of a reference signal; reference circuit means for comparing said signals, and for generating an error signal responsive to the compared signals; second drive means for actuating movement of said detecting means relative to said field; first circuit means interposed between said reference circuit means and said second drive means and including first switch means selectively operable to connect said reference circuit means to said second drive means for movement of said detecting means relative to said field responsive to said error signal in a direction for reducing the magnitude of said error signal; third drive means for actuating movement of said regulating rod; second circuit means interposed between said reference circuit means and said third drive means and including second switch means selectively operable to connect said reference circuit means to said third drive means for movement of said regulating rod responsive to said error signal in a direction for reducing the magnitude of said error signal; second programming means; and third circuit means interposed between said second programming means and said second drive means and including third switch means selectively operable to connect said second programming means to said second drive means for movement of said detecting means relative to said field according to a program of said second programming means.

5. In a control device as set forth in claim 4, first signal generating means responsive to said error signal for generating a control signal when said error signal has a predetermined property selected from the group consisting of error signal magnitude and rate of change of error signal magnitude; fourth circuit means for transmitting said control signal to one of said programming means for controlling operation of the latter; second signal generating means responsive to the position of said detecting means to generate a position signal when said detecting means is in a predetermined position relative to said reactor; and fifth circuit means for transmitting said position signal to one of said programming means for controlling operation of the latter.

References Cited in the file of this patent

Schultz: "Control of Nuclear Reactors and Power Plants," McGraw-Hill Book Co., N.Y. (1955), pp. 70 and 189–190.